United States Patent
Selva et al.

(10) Patent No.: US 12,306,908 B2
(45) Date of Patent: May 20, 2025

(54) DETERMINATION OF NOISE IN A SIGNAL

(71) Applicant: ORANGE, Issy-les-Moulineaux (FR)

(72) Inventors: Esteban Selva, Chatillon (FR); Apostolos Kountouris, Chatillon (FR)

(73) Assignee: ORANGE, Issy-les-Moulineaux (FR)

(*) Notice: Subject to any disclaimer, the term of this patent is extended or adjusted under 35 U.S.C. 154(b) by 527 days.

(21) Appl. No.: 17/358,550

(22) Filed: Jun. 25, 2021

(65) Prior Publication Data
US 2022/0019788 A1   Jan. 20, 2022

(30) Foreign Application Priority Data
Jun. 26, 2020   (FR) .................................. 2006752

(51) Int. Cl.
*G06F 18/23213* (2023.01)
*G06F 18/2413* (2023.01)
*H04B 1/10* (2006.01)

(52) U.S. Cl.
CPC .. *G06F 18/24137* (2023.01); *G06F 18/23213* (2023.01); *H04B 1/1027* (2013.01); *G06F 2218/04* (2023.01); *G06F 2218/14* (2023.01); *G06F 2218/22* (2023.01)

(58) Field of Classification Search
CPC ......... G06F 18/24137; G06F 18/23213; G06F 2218/04; G06F 2218/14; G06F 2218/22; G06F 2218/02; G06F 7/00; H04B 1/1027; H04B 17/26; H04B 17/318; H04B 17/345; H04L 1/20
USPC .......................................................... 702/69
See application file for complete search history.

(56) References Cited

U.S. PATENT DOCUMENTS

| | | | |
|---|---|---|---|
| 9,564,980 B2* | 2/2017 | Hwang | H04B 17/336 |
| 2007/0091720 A1* | 4/2007 | Woo | H04L 27/0006 |
| | | | 367/39 |
| 2007/0263712 A1* | 11/2007 | Ling | H04L 1/20 |
| | | | 375/227 |

(Continued)

OTHER PUBLICATIONS

Smith, Julius O. "Signal Metrics." Mathematics of the Discrete Fourier Transform (DFT): With Audio Applications, 2nd ed., BookSurge, North Charleston, 2007. (Year: 2007).*

(Continued)

*Primary Examiner* — Lisa M Caputo
*Assistant Examiner* — Joshua L Forristall
(74) *Attorney, Agent, or Firm* — David D. Brush; Westman, Champlin & Koehler, P.A.

(57) ABSTRACT

A method for determining noise associated with a received signal in a telecommunications network, the received signal being sampled beforehand in the form of a succession of data. The method includes: selecting a portion of the data in the received signal and determining a given number of possible partitions of the selected portion of the data in the received signal, the number of partitions being greater than or equal to two; partitioning all of the data in the received signal into the number of partitions; estimating mean energies of the signal in each of the partitions and identifying a partition from among the partitions having a minimum mean, the identified partition being a noise partition; and estimating a variance of the noise partition, the noise associated with the received signal being a function of the variance of the noise partition.

17 Claims, 3 Drawing Sheets

(56) References Cited

U.S. PATENT DOCUMENTS

| | | | |
|---|---|---|---|
| 2012/0133789 A1* | 5/2012 | Wu | G06V 10/763 |
| | | | 348/222.1 |
| 2013/0080431 A1* | 3/2013 | Guillemot | G06F 16/20 |
| | | | 707/736 |
| 2013/0322425 A1 | 12/2013 | Murrin et al. | |
| 2017/0205510 A1 | 7/2017 | Davies | |
| 2018/0014768 A1* | 1/2018 | Chatterjee | G06F 18/2115 |
| 2020/0036684 A1* | 1/2020 | Thompson | H04L 63/1416 |

OTHER PUBLICATIONS

Dabbura, Imad. "K-Means Clustering: Algorithm, Applications, Evaluation Methods, and Drawbacks." Medium, Towards Data Science, May 26, 2020, towardsdatascience.com/k-means-clustering-algorithm-applications-evaluation-methods-and-drawbacks-aa03e644b48a. (Year: 2020).*

Gupta, A. (Jun. 6, 2019). Silhouette algorithm to determine the optimal value of k. GeeksforGeeks. https://www.geeksforgeeks.org/silhouette-algorithm-to-determine-the-optimal-value-of-k/ (Year: 2019).*

French Search Report and English translation of Written Opinion dated Mar. 12, 2021 for corresponding French Application No. 2006752, filed Jun. 26, 2020.

M. Hamid, N. Björsell and S. Ben Slimane, "Samples Covariance Matrix Eigenvalues Based Blind SNR Estimation" 2014 IEEE International Instrumentation and Measurement Technology Conference (I2MTC) Proceedings, Montevideo, 2014, pp. 718-722.

D. Makovoz, "Noise Variance Estimation In Signal Processing" 2006 IEEE International Symposium on Signal Processing and Information Technology, Vancouver, BC, 2006, pp. 364-369.

\* cited by examiner

202 — For an optimum number k between 2 and N

204 — Partition a portion of the signal

Estimate a silhouette coefficient corresponding to the optimum number i k > N

206 — Select the optimum number

302 — Generate centers of gravity for the partitions

304 — Partition the data in the signal

306 — Update the centers of gravity

308 — Return the partitions of the signal

[Fig. 4]

DETERMINATION OF NOISE IN A SIGNAL

TECHNICAL FIELD

The present disclosure relates to the field of signal processing, in particular the field of determining noise in a signal, for example a signal that is parsimonious in the frequency domain.

PRIOR ART

It is known, in the field of signal processing methods and devices, to determine noise in a signal based on the noise variance estimation.

One method, presented for example in the document by M. Hamid, N. Björsell and S. Ben Slimane, "Sample covariance matrix eigen values based blind SNR estimation" 2014 IEEE International Instrumentation and Measurement Technology Conference (I2MTC) Proceedings, Montevideo, 2014, pp. 718-722, is known for determining noise variance, comprising calculating eigenvalues of the sample covariance matrix of the signal, and using a minimum description length criterion to separate the eigenvalues relating only to noise from those relating to the mixture of payload signal and noise. To determine noise variance, Marchenko-Pastur densities are calculated based on parameters linked to the eigenvalues relating to noise, and a quality of the adjustment on parameters linked to these densities makes it possible to arrive at the noise variance estimation.

However, calculating the covariance matrix and breaking it down into eigenvalues and eigenvectors is expensive in terms of calculating, and results in a cubic polynomial complexity of $O(n^3)$, that is to say, for a number n of data used in the method, it is necessary to perform a number $n^3$ of operations. The reproducibility of the noise variance estimation is also not guaranteed. This method requires numerous calculating steps, thereby increasing the possibility of numerical instabilities and of these propagating to each step of the method. In addition, the number of signal samples required is relatively large, thereby increasing the resources required.

Another method, presented in particular in the document by D. Makovoz, "Noise Variance Estimation In Signal Processing" 2006 IEEE International Symposium on Signal Processing and Information Technology, Vancouver, B C, 2006, pp. 364-369, is known for determining noise variance in a parsimonious signal, comprising determining a subset of samples of the signal containing exclusively aberrant values corresponding to payload signal, and sorting these aberrant values in ascending order. The method also comprises determining a portion of the distribution function of a centered normal law whose variance corresponds to noise variance.

Such a method makes it possible to determine noise variance in a precise manner, but lacks repeatability.

The present disclosure aims to rectify the abovementioned drawbacks.

SUMMARY

To this end, according to a first aspect, what is proposed is a method for determining noise associated with a received signal, received for example by an equipment connected to a telecommunications network, said received signal being sampled beforehand in the form of a succession of data, the method comprising:

selecting a portion of the data in the received signal and determining a given number of possible partitions of the selected portion of the data in the received signal, the number of partitions being greater than or equal to two, partitioning all of the data in the received signal into said number of partitions, estimating mean energies of the signal in each of the partitions and identifying a partition from among said partitions having a minimum mean, the identified partition being a noise partition, and estimating a variance of the noise partition, the noise associated with the received signal being a function of said variance of the noise partition.

Since the number of possible partitions is determined based on a portion of the data in the signal, it is possible to reduce the required calculating resources. In addition, the method is more robust and less complex, since it does not require any numerical equations to be solved.

The features disclosed in the following paragraphs may optionally be implemented. They may be implemented independently of one another or in combination with one another.

The received signal may be any type of signal in the time or frequency domain. The received signal may in particular be a signal that is parsimonious in the frequency domain. The method may be used to estimate the variance of any type of noise, in particular additive Gaussian white noise. The received signal may be received by an equipment of the telecommunications network.

The selection of received signal data portions may for example be random. This selection may be performed through a random draw from a predetermined number of data in the received signal. As an alternative, the selection of data portions in the received signal may be performed through a targeted or random selection in each frequency sub-band of the received signal.

The variance of the noise partition may be the mean energy of the noise partition.

The method may furthermore comprise:

refining the variance estimation by determining aberrant data from among the data in the received signal in the noise partition and weighting said aberrant data in the noise partition.

This step makes it possible to obtain a more coherent noise partition, and the method is thus more robust.

For example, data having an energy that exceeds a given threshold may be considered to be aberrant data in the noise partition and may be removed from the noise partition or weighted by a given coefficient. This threshold may be determined using the "three standard deviations" method or any other statistical method.

According to one embodiment, determining the number of partitions may comprise:

varying the number of partitions between given values and, for each value of the number of partitions:

partitioning the portion of the data in the received signal according to the value of the number of partitions, calculating a quality coefficient that measures the quality of the partitioning of the portion of the data in the received signal, and associating the value of the number of partitions with the quality coefficient.

The method may furthermore comprise selecting the value of an optimum number of partitions corresponding to the value of the number of partitions associated with the highest quality coefficient.

The partitioning of the portion of the data in the received signal may be performed using any partitioning method, such as the k-means method, pattern matching methods or hierarchical grouping methods.

For example, the optimum number may vary between 2 and 7.

According to one embodiment, the partitioning of the data in the received signal may be performed using a k-means method comprising the preliminary generation of a center of gravity for each partition and the iterative steps of:

for each center of gravity, assigning the data in the received signal that are closest to the center of gravity into the partition corresponding to the center of gravity, and for each partition, updating the center of gravity of the partition on the basis of the mean energy of the signal in the partition.

The k-means method makes it possible to reduce the complexity of the method and to achieve homogeneous partitioning of the data in the received signal.

According to this embodiment, the quality coefficient may be a silhouette coefficient. The silhouette coefficient is a coefficient between −1 and 1 and measures the quality of the partitioning of a set of data into various partitions. The higher the silhouette coefficient, the more relevant the partitioning. The optimum number of partitions thus corresponds to the highest silhouette coefficient.

The partitioning of the data in the received signal may be terminated when a number of iterations of the iterative steps is reached or when the centers of gravity of the partitions are unchanged from one iteration to the next. The method is thus robust regardless of the data in the received signal, and termination thereof is always guaranteed.

According to one embodiment, the method may comprise, beforehand, preprocessing of the received signal comprising:

estimating energies of the received signal for a plurality of sub-bands, windowing said energies of the received signal on the basis of a window of given length, and generating the data in the received signal by summing and weighting the windowed energies of the received signal.

These preprocessing steps make it possible to consolidate the data in the received signal. The energies may in particular be windowed in a rectangular window of a predetermined length. This length may be chosen so as to optimize the partitioning. The sub-bands may be frequency sub-bands of the received signal having an identical width or variable widths.

For example, the steps of the method may be applied to the data in the received signal after the preprocessing or without the preprocessing.

According to another aspect, what is proposed is a method for estimating a signal-to-noise ratio of a received signal, comprising:

determining a variance of noise associated with the received signal using a noise variance estimation method as defined above;

estimating the noise on the basis of the determined variance, and estimating the signal-to-noise ratio on the basis of the noise and of the received signal.

According to another aspect, what is proposed is a method for detecting the presence of a signal in a telecommunications system, comprising:

determining a variance of noise associated with a signal based on samples determined according to a noise variance estimation method as defined above;

estimating a detection threshold on the basis of the determined variance, receiving an energy for a given acquisition duration, and determining the presence of a signal when the received energy is greater than the estimated detection threshold.

According to another aspect, what is proposed is a method for estimating a spectral occupancy level of a previously sampled received signal, comprising:

for each frequency sub-band of a plurality of sub-bands of the received signal, determining a carrier of the signal by detecting the presence of a signal in said frequency sub-band according to the method for detecting the presence of a signal as defined above, and estimating the spectral occupancy level on the basis of the one or more determined carriers of the signal.

According to another aspect, what is proposed is a device for determining noise associated with a signal received by said device, comprising a processing circuit for implementing the noise variance estimation method as defined above. This device may typically be the abovementioned equipment, connected to the telecommunications network, or else be a subcomponent of this equipment (for example a noise estimation module).

According to another aspect, what is proposed is a computer program comprising instructions for implementing all or part of a method as defined above when this program is executed by a processor. According to another aspect, what is proposed is a non-transient computer-readable recording medium on which such a program is recorded.

BRIEF DESCRIPTION OF THE DRAWINGS

Other features, details and advantages will become apparent from reading the following detailed description, and from analyzing the appended drawings, in which.

Unless indicated otherwise, common or analogous elements in multiple figures bear the same reference signs and have identical or analogous features, and so these common elements are not generally described again for the sake of simplicity.

DESCRIPTION OF THE EMBODIMENTS

Figure 1:
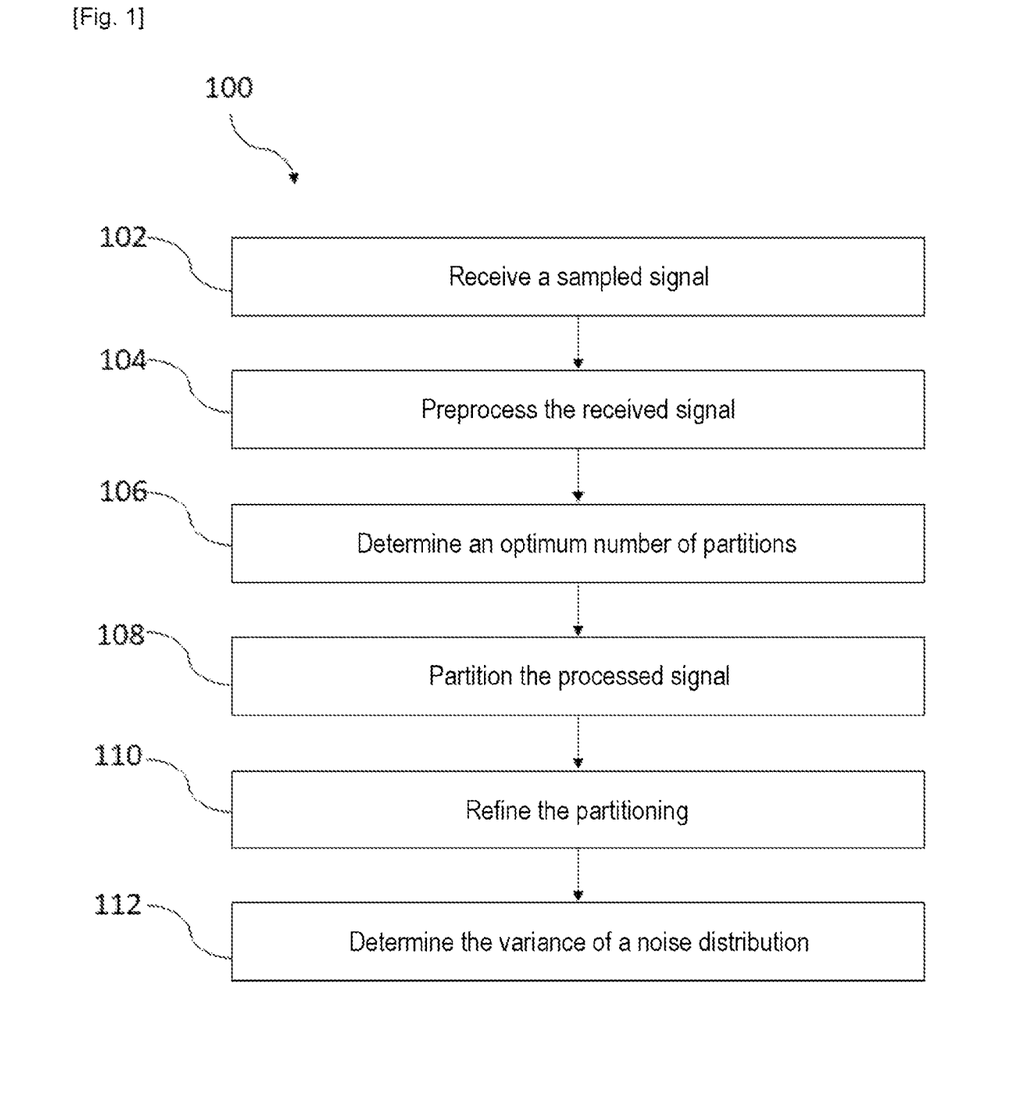
FIG. 1 shows, in the form of a flowchart, one example of steps of a method for determining noise variance in a signal, according to one embodiment.

Reference is now made to FIG. 1. The method 100 comprises a first step 102 of receiving a previously sampled signal. The received signal contains a payload signal and noise. The method of FIG. 1 aims to determine the variance of this noise. The received signal may be any type of signal, in particular a signal that is parsimonious in the frequency or time domain. The received signal may be a radio signal.

For example, the received signal is parsimonious in the frequency spectrum, and exhibits spectral occupancy of the payload signal in the listening band of lower than 25%. The payload signal may be formed of multiple non-consecutive sub-bands, the signal then being called a multi-band signal, each sub-band possibly containing on average at least around thirty samples, this corresponding to less than 0.5% spectral occupancy for a sub-band, considering a payload signal with 6000 samples.

The received signal is represented below in the frequency domain by a vector XF of length L. Of course, the method is not limited to a signal sampled in the frequency domain, and may apply to a signal sampled in the time domain.

In a preprocessing step 104, the received signal XF undergoes processing consisting in:
calculating the energy of the received signal XF for each sub-band of the received signal, which is equal to the square of the modulus of the received signal XF on a given sub-band,
windowing the calculated energies in a rectangular window of predetermined length T, and
summing and weighting the windowed values so as to arrive at a processed signal vector PS of size L-T.

Each sub-band of the signal is also called a bin. The steps below consist in applying the following formula to the received signal XF:

$$\forall\, i \in [[0, L-T]], PS[i] = \frac{1}{LT}\sum_{k=i}^{i+T}|XF[k]|^2 \quad \text{[math 1]}$$

The predetermined length T of the rectangular window may be equal to 30. This length is chosen so as to optimize the method 100.

The method 100 may comprise receiving a processed signal PS directly. In this case, the preprocessing step 102 is not necessary.

The method 100 then comprises a step 106 of determining an optimum number of partitions of the received signal. Indeed, the optimum number of partitions is unknown a priori. This step is performed on a preselected portion of the processed signal PS. The preselected portion may be chosen randomly from the processed signal PS or from each sub-band of the processed signal PS.

When the optimum number of partitions is determined, the method 100 comprises partitioning 108 the processed signal PS into the optimum number of partitions determined in step 106. The partitioning (step 108) is performed on the whole of the processed signal PS. At the end of this step, at least two partitions of the processed signal PS are obtained, in particular an optimum number of partitions of the processed signal PS are obtained. One partition, called noise partition, from among these partitions comprises vector values PS containing only noise. This noise partition is the one having a mean energy of the values of the processed signal PS that is lowest in comparison with the mean energy of the values of the processed signal PS in the other partitions. The noise partition may have a value distribution of the processed signal PS that converges on a normal mean $N_0$ and standard deviation $\sigma$ law G.

The partitioning 108 of the processed signal PS may be performed using various methods, for example using the k-means method, using pattern matching methods, using hierarchical grouping methods, etc.

To ensure effective partitioning of the received signal XF, the length T of the rectangular window during the preprocessing 104 of the received signal XF is optimized. Indeed, an excessively low value of the length T risks promoting the dispersion of the energy values of the processed signal PS, thereby making the partitioning more difficult and therefore less effective. By contrast, an excessively large value of the length T increases the number of values, called boundaries of the processed signal PS, that correspond partly only to noise values and partly to a mixture of payload signal and noise, this also being detrimental to the partitioning.

Noise variance is determined by estimating the variance of the noise partition in step 112. This variance may correspond to the mean No of the noise partition.

According to one embodiment, the method 100 comprises a step 110 in which the partitioning of the processed signal PS, performed in step 108, is refined. Step 110 aims to remove values of the processed signal PS from the noise partition that potentially correspond to low-energy payload signal values that might be confused with noise. For example, for the noise partition having a Gaussian distribution G, such values correspond to aberrant values. Indeed, the values of the noise partition containing a mixture of payload signal and noise are generally far higher than those containing only noise, and are few in number, and are therefore easy to isolate.

To remove these aberrant values, it is possible to set a for example "three standard deviation" threshold beyond which these values are excluded. The mean $N_0$ and the standard deviation $\sigma$ of the values contained in the noise partition are calculated, and aberrant values considered to be those greater than ($N_0+3\sigma$) are removed. These steps are repeated until no further aberrant value is detected. The noise partition is thus more coherent. Convergence of the iterations in these steps may generally be achieved in 1 to 10 iterations. However, the number of iterations will be limited to a predetermined threshold value, for example equal to 20. Step 110 is terminated when the number of iterations exceeds the abovementioned threshold value so as to avoid the least favorable situations in which the method does not converge on a satisfactory solution, in order to guarantee that the method 100 will terminate.

Steps 106 to 112 described above are applied to the processed signal PS, but may be applied directly to the received signal XF.

The method 100 is advantageous in that an optimum number of partitions is determined on a portion of the processed signal XF, thereby considerably reducing the required calculating resources. The method 100 additionally makes it possible to obtain a more precise and reliable noise variance estimation. Indeed, the inventors have observed a variance determination with a deviation on the noise variance estimation of the order of 1 to 3% on average and a standard deviation of around 2%. The method 100 has a limited number of steps and is not based on a numerical solution to equations, thereby having the effect of limiting the propagation of numerical instabilities. The method 100 thus exhibits linear complexity with respect to a number n of samples, in other words the complexity is of the type O(n). The method 100 furthermore makes it possible to determine noise variance based on a small number of samples. The inventors have observed that a number of samples required to achieve good performance should be between 1000 and 8000, and at most equal to 16000, depending on the degree of time/frequency occupancy of the received signal. This makes it possible to perform the noise variance estimation more frequently, which may be used for the purposes of reconfiguring a telecommunications system.

The method 100 may be used to determine the variance of any type of noise, in particular additive Gaussian white noise.

The variance determined using the method 100 may be used in a telecommunications system to estimate the transmission quality of a signal S, for example by estimating the signal-to-noise ratio (SNR). According to this embodiment, the noise B in the signal S is estimated based on the variance obtained in step 112 as follows:

$$B = M*N_0 \quad \text{[math 2]}$$

Where M is the number of samples contained in the signal S.

The signal-to-noise ratio SNR may be calculated using the following formula:

$$RSB = \frac{S+B}{B} - 1 \quad \text{[math 3]}$$

According to another embodiment, the variance determined in step 112 may be used to detect the presence of a signal in a telecommunications system. To this end, an energy threshold is determined on the basis of the variance. Such a detection method makes it possible to detect the presence of a signal when the received energy is greater than the energy threshold.

According to another embodiment, the variance determined in step 112 may be used to determine the parsimony level of the signal, that is to say the spectral occupancy level of the signal. To this end, a signal carrier is determined for each frequency sub-band of the signal. A signal carrier is determined if a signal is detected in this sub-band, for example by detecting an energy greater than the above-described energy threshold. The signal carriers thus determined make it possible to estimate the distribution of the signal in the frequency domain.

Figure 2:
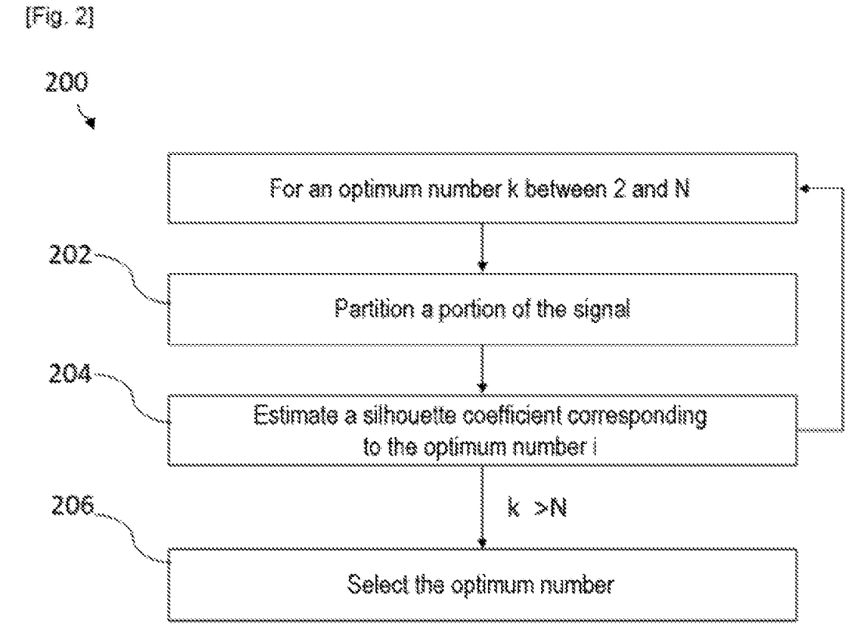
FIG. 2 shows, in the form of a flowchart, one example of steps for determining the optimum number of partitions according to one embodiment.

FIG. 2 shows one example of a method (200) for determining the optimum number that may be implemented in step 106 of the method 100. In the method 200, the optimum number is determined for partitioning using the k-means method.

The method 200 is applied to a subset of reduced length extracted from the processed signal PS. This subset may be selected through a random draw, without replacement, from 100 values in the processed signal PS. This subset makes it possible to greatly reduce the complexity of the method 200 without a significant negative impact on the choice of the optimum number of partitions.

The method 200 comprises a number k of iterations of steps 202 and 204, the number k being an integer and varying between 2 and a predetermined number N, for example equal to 7. Step 202 comprises partitioning the subset of the processed signal PS into the number k of partitions. For a number k of partitions of the subset of the processed signal PS, a silhouette coefficient is calculated in step 204.

The silhouette coefficient is used to ascertain the optimum number of clusters. The silhouette coefficient is between −1 and 1 and measures the quality of the partitioning of a set of data into various partitions. The higher the silhouette coefficient, the more relevant the partitioning.

At the end of the iterations of steps 202 and 204, the optimum number of partitions of the processed signal PS is determined on the basis of the silhouette coefficients calculated in step 204. The number of partitions k corresponding to the highest silhouette coefficient is adopted as the optimum number, denoted K, of partitions.

The method 200 may comprise an additional step for determining whether the received signal is able to be partitioned. For example, when all of the silhouette coefficients, determined in step 204, are lower than 0.7, the received signal is considered to be unsuitable for partitioning and the method 200 is terminated. Indeed, when the silhouette coefficients are all lower than 0.7, this corresponds to a received signal comprising only payload signal or to a received signal distributed over an excessively large number of frequencies, thereby risking limiting the performance of the method 200.

Figure 3:
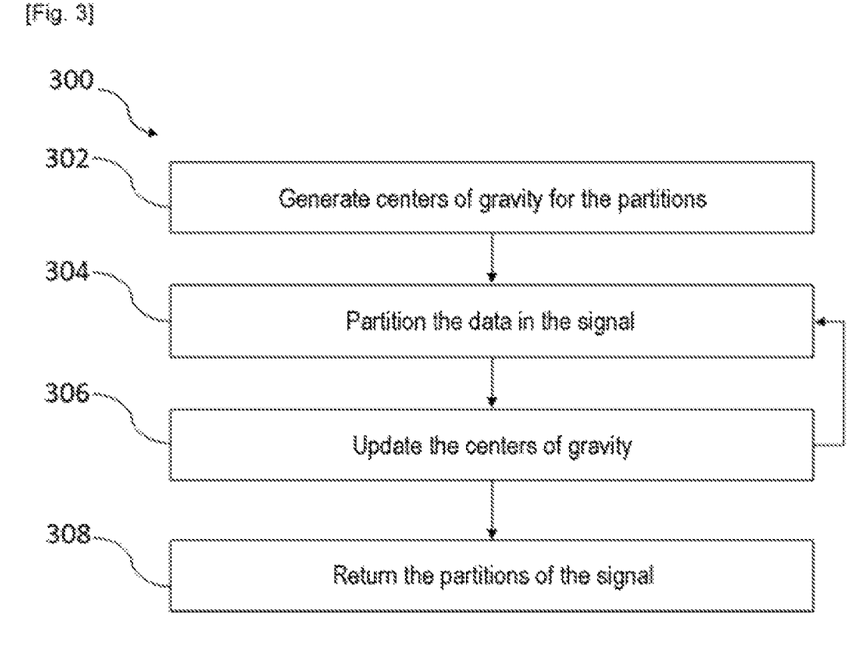
FIG. 3 shows, in the form of a flowchart, one example of steps for partitioning the data in a received signal according to one embodiment.

FIG. 3 shows one example of a method (300) for partitioning a received signal that may be implemented in step 108 of the method 100. The method 300 implements the partitioning method using the k-means method. The method 300 is applied to the set of data in the processed signal PS.

The method 300 comprises an initialization step 302 comprising generating a center of gravity for each partition of the processed signal XF. The number of centers of gravity corresponds to the optimum number of partitions, for example the optimum number K determined according to the method 200 of FIG. 2. The centers of gravity may be generated using the "k-means++" method.

The method 300 then comprises a step 304 of partitioning the set of data in the processed signal PS on the basis of the centers of gravity. To this end, each item of data in the processed signal PS is assigned to the closest center of gravity. The set of data in the processed signal PS assigned to a center of gravity thus forms a partition.

The method 300 then comprises a step 306 of updating the centers of gravity. Each center of gravity is updated with the mean energy of its partition.

Steps 304 and 306 are reiterated until the values of the centers of gravity converge, that is to say that they are no longer modified in update step 306. When steps 304 and 306 are reiterated for a previously determined limited number of iterations, the method 300 is terminated.

At the end of the iterations of steps 304 and 306, the processed signal PS is partitioned into the optimum number of partitions.

Figure 4:
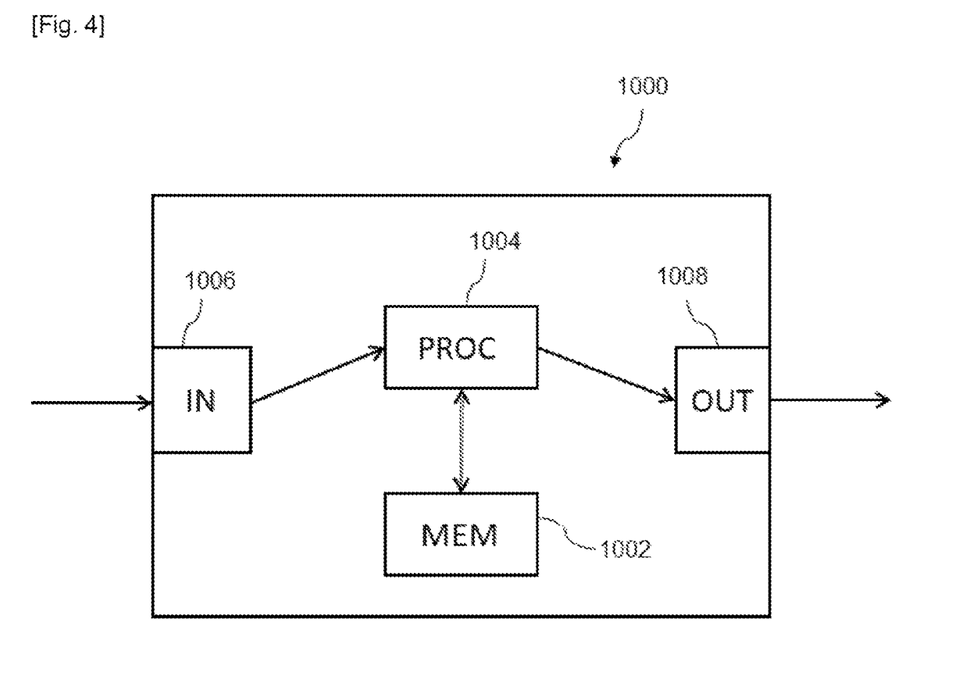
FIG. 4 shows a schematic block diagram of a processing circuit for implementing a method according to the invention according to one embodiment.

FIG. 4 illustrates, according to one particular embodiment of the invention, a device 1000 for implementing the noise variance determination method described above with reference to FIG. 1.

The device 1000, which is preferably an integrated circuit, is contained within a telecommunications system, for example a radio antenna, a communication terminal, etc.

The device 1000 comprises a storage space 1002, for example a memory MEM, and a processing unit 1004 equipped for example with a processor PROC. The storage space 1002 is for example a non-volatile memory (ROM or flash memory for example), and may constitute a recording medium, this recording medium also being able to comprise a computer program.

The device 1000 furthermore comprises a communication module allowing the device to connect to a telecommunications network and to exchange data with other devices via the telecommunications network. For example, the communication module may be a WiFi or Ethernet network interface, or else a Bluetooth communication module.

The communication module of the device 1000 comprises a data reception module 1006, for example a receiver IN, and a data transmission module 1008, for example a transmitter OUT.

The module 1006 is configured so as to receive a signal containing noise. The module 1008 is configured so as to return a given variance and/or noise estimated on the basis of said variance.

The storage space 1002, which may be secure, is configured so as to record and store any item of data read by the module 1006, processed by the unit 1004 and/or sent by the module 1008.

The processing unit 1004, which may be driven by a program, is configured so as to implement the noise variance determination method as described with reference to FIG. 1.

On initialization, the instructions of a program driving the processing unit 1004 are for example loaded into a random access memory (RAM for example), not shown, contained in the device 1000, before being executed by the processor of the processing unit 1004.

The invention claimed is:

1. A method comprising:
   determining noise associated with a signal received by an equipment connected to a telecommunications network, said received signal being sampled beforehand in the form of data, the determining being implemented by a device and comprising:
   selecting a portion of the data in the received signal,
   determining a number of partitions, the number of partitions being an estimated optimum number of partitions of the selected portion of the data in the received signal, the number of partitions being greater than or equal to two,
   partitioning all of the data in the received signal into said number of partitions,
   estimating mean energies of the signal in each of the partitions and identifying a partition from among said partitions having a minimum mean, the identified partition being a noise partition,
   estimating a variance of the noise partition, the noise associated with the received signal being a function of said variance of the noise partition, and
   determining said noise based on the estimated variance of the noise partition,
   wherein selecting a portion of the data comprises:
      a random selection of a portion of the data;
      a targeted selection of a portion of the data in each frequency sub-band of the received signal; or
      a random selection of a portion of the data in each frequency sub-band of the received signal.

2. The method as claimed in claim 1, comprising:
   refining the variance estimation by determining aberrant data from among the data in the received signal in the noise partition and weighting said aberrant data in the noise partition.

3. The method as claimed in claim 1, wherein determining the number of partitions comprises:
   varying the number of partitions between given values and, for each value of the number of partitions:
      partitioning the portion of the data in the received signal according to the value of the number of partitions,
      calculating a quality coefficient that measures the quality of the partitioning of the portion of the data in the received signal,
      associating the value of the number of partitions with the quality coefficient; and
   said method furthermore comprising selecting the value of an optimum number of partitions corresponding to the number of partitions associated with the highest quality coefficient.

4. The method as claimed in claim 1, wherein the partitioning of the data in the received signal is performed using a k-means method comprising the preliminary generation of a center of gravity for each partition and iterative steps of:
   for each center of gravity, assigning the data in the received signal that are closest to said center of gravity into the partition corresponding to said center of gravity, and
   for each partition, updating the center of gravity of said partition on the basis of the mean energy of the signal in said partition.

5. The method as claimed in claim 3, wherein the partitioning of the data in the received signal is performed using a k-means method comprising the preliminary generation of a center of gravity for each partition and iterative steps of:
   for each center of gravity, assigning the data in the received signal that are closest to said center of gravity into the partition corresponding to said center of gravity, and
   for each partition, updating the center of gravity of said partition on the basis of the mean energy of the signal in said partition, and wherein the quality coefficient is a silhouette coefficient.

6. The method as claimed in claim 4, wherein the partitioning of the data in the received signal is terminated when a number of iterations of the iterative steps is reached or when the centers of gravity of the partitions are unchanged from one iteration to the next.

7. The method as claimed in claim 1, comprising, beforehand, preprocessing of the received signal comprising:
   estimating energies of the received signal for a plurality of sub-bands,
   windowing said energies of the received signal on the basis of a window of given length, and
   generating the data in the received signal by summing and weighting the windowed energies of the received signal.

8. The method as claimed in claim 1, wherein the selection of a received signal data portion is random.

9. The method as claimed in claim 1, wherein the determined variance of the noise partition is the mean energy of the noise partition.

10. The method as claimed in claim 1, further comprising:
    estimating a signal-to-noise ratio of the received signal, comprising:
    estimating the noise on the basis of the determined variance, and
    estimating the signal-to-noise ratio on the basis of the noise and of the received signal.

11. The method as claimed in claim 1, further comprising detecting presence of a potential signal in the telecommunications network, comprising:
    after estimating the variance of the noise associated with the signal:
    estimating a detection threshold on the basis of the estimated variance,
    receiving an external energy for a given acquisition duration, and
    determining the presence of the potential signal when the received external energy is greater than the estimated detection threshold.

12. The method as claimed in claim 11, further comprising:
    estimating a spectral occupancy level of the sampled received signal, comprising:
    for each frequency sub-band of a plurality of sub-bands of the received signal, determining a carrier of the signal by detecting presence of the signal in said frequency sub-band according to the method as claimed in claim 11, and estimating the spectral occupancy level on the basis of the one or more determined carriers of the signal.

13. The method as claimed in claim 1, wherein selecting a portion of the data comprises the random selection of a portion of the data.

14. The method as claimed in claim 1, wherein selecting a portion of the data comprises the targeted selection of a portion of the data in each frequency sub-band of the received signal.

15. The method as claimed in claim 1, wherein selecting a portion of the data comprises the random selection of a portion of the data in each frequency sub-band of the received signal.

16. A device for determining noise associated with a signal received by said device, comprising:

a processing circuit configured to:

determine noise associated with a signal received by an equipment connected to a telecommunications network, said received signal being sampled beforehand in the form of data, the determining being implemented by said device and comprising:

selecting a portion of the data in the received signal and determining a number of partitions of the selected portion of the data in the received signal, the number of partitions being an estimated optimum number of partitions, the number of partitions being greater than or equal to two, partitioning all of the data in the received signal into said number of partitions, estimating mean energies of the signal in each of the partitions and identifying a partition from among said partitions having a minimum mean, the identified partition being a noise partition, estimating a variance of the noise partition, the noise associated with the received signal being a function of said variance of the noise partition, determining said noise based on the estimated variance of the noise partition, wherein selecting a portion of the data comprises:
 a random selection of a portion of the data;
 a targeted selection of a portion of the data in each frequency sub-band of the received signal; or
 a random selection of a portion of the data in each frequency sub-band of the received signal.

17. A non-transitory computer program storage medium storing instructions for implementing a method of determining noise associated with a signal received by an equipment connected to a telecommunications network, when said instructions are executed by a processor of a processing circuit, said received signal being sampled beforehand in the form of data, wherein the instructions configure the processing circuit to:

select a portion of the data in the received signal and determining a number of partitions of the selected portion of the data in the received signal, the number of partitions being an estimated optimum number of partitions, the number of partitions being greater than or equal to two, partition all of the data in the received signal into said number of partitions, estimate mean energies of the signal in each of the partitions and identify a partition from among said partitions having a minimum mean, the identified partition being a noise partition, estimate a variance of the noise partition, the noise associated with the received signal being a function of said variance of the noise partition, and determine said noise based on the estimated variance of the noise partition, wherein selecting a portion of the data comprises:
 a random selection of a portion of the data;
 a targeted selection of a portion of the data in each frequency sub-band of the received signal; or
 a random selection of a portion of the data in each frequency sub-band of the received signal.

* * * * *